Figure 3:
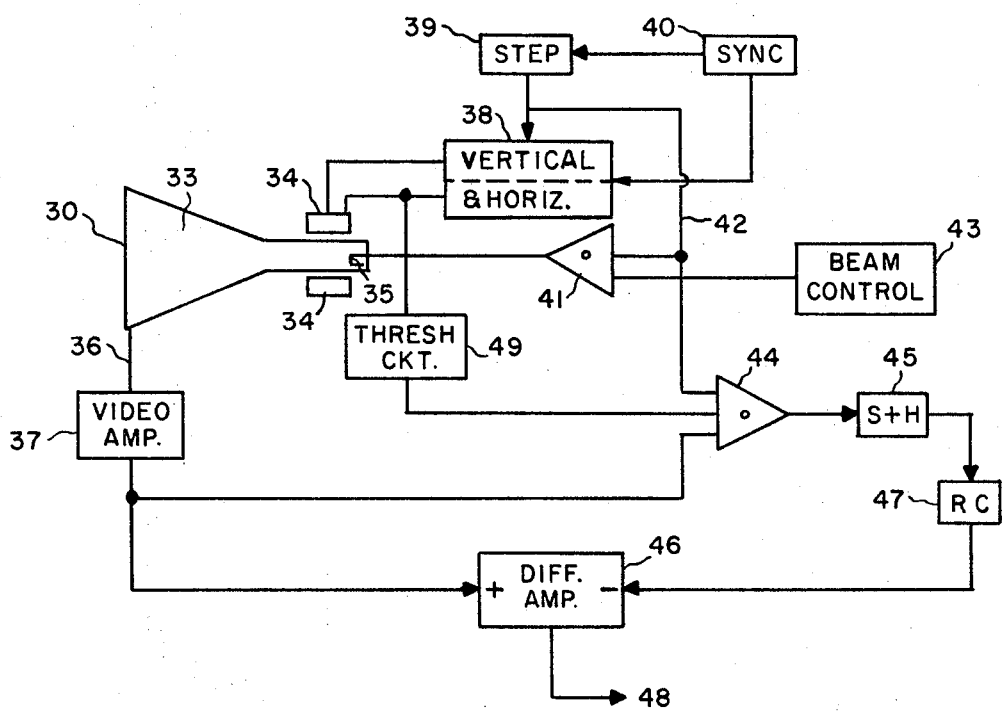

United States Patent

[11] 3,584,146

[72] Inventors Pieter G. Cath
 Briarcliff Manor;
 Edward H. Stupp, Spring Valley; Edmund
 S. Rittner, White Plains, all of, N.Y.
[21] Appl. No. 777,796
[22] Filed Nov. 21, 1968
[45] Patented June 8, 1971
[73] Assignee U.S. Philips Corporation
 New York, N.Y.

[54] AUTOMATIC DARK CURRENT CORRECTION
 5 Claims, 6 Drawing Figs.
[52] U.S. Cl...................................... 178/7.2,
 178/7.1
[51] Int. Cl...................................... H04n 5/38
[50] Field of Search............................ 178/7.2 E,
 7.1 DC, 6 DCA

[56] References Cited
UNITED STATES PATENTS
3,126,447 3/1964 Bendell ........................ 178/7.1 DC Primary Examiner—Richard Murray
Assistant Examiner—George G. Stellar
Attorney—Frank R. Trifari ABSTRACT: Dark current compensation in a video imaging tube is accomplished by virtue of establishing a dark current level and subtracting it from the video signal. The dark current level can be established by overscanning or scanning a nonexposed area of the image tube or by means of a compensating video sensing segment positioned directly on the actual video sensing segment. In a silicon target tube, the compensating junction can consist of a conveniently sized assembly or mosaiced junctions similar to those of the target, and connected in parallel with the target. The subtraction signal can then be placed in a sample and hold circuit, averaged and subtracted from the actual video signal during a successive scan.

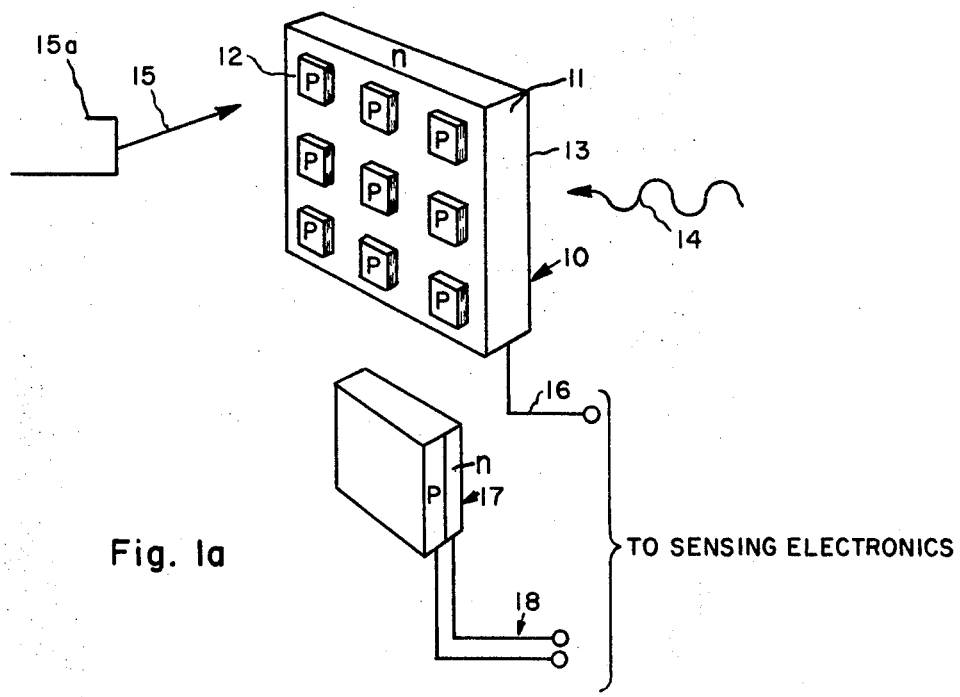
Fig. 1a
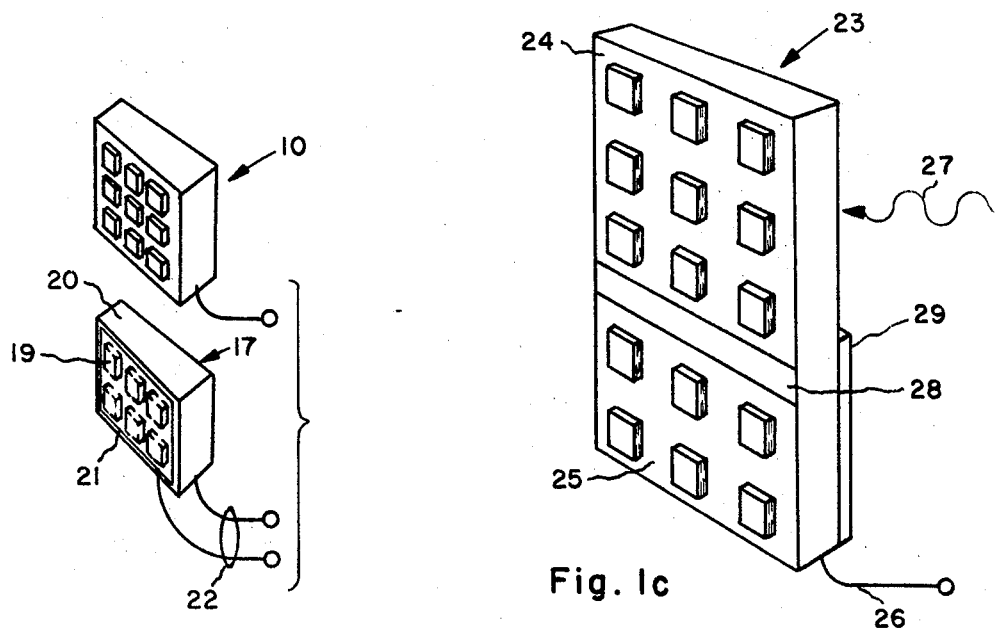
Fig. 1b
Fig. 1c
INVENTORS.
EDMUND S. RITTNER
EDWARD H. STUPP
PIETER G. CATH
BY
AGENT

INVENTORS.
EDMUND S. RITTNER
EDWARD H. STUPP
PIETER G. CATH

BY Frank R. ...

AGENT

AUTOMATIC DARK CURRENT CORRECTION

This invention relates generally to video image systems and particularly to automatic dark current compensation or correction in a video imaging tube.

The use of a vidicon tube in broadcast camera equipment gives rise to certain problems because of the elevated temperatures at which these cameras have to operate. The dark current of the tube may thus vary over a wide range as the temperature changes. Several methods have been proposed to avoid having to make manual adjustments under these conditions.

The first possibility is a temperature sensor attached to the outside of the tube. The measured temperature would then be used to subtract a constant amount of current from the video signal, removing the excess dark current due to temperature variations. The difficulty of this method is that there may be a temperature gradient between the outside of the tube and the sensing wafer. Secondly, such an arrangement will require careful adjustment to assure proper temperature tracking.

A recent improvement over the standard form of video imaging tube is the silicon diode target tube. The silicon tube includes a PN junction or a mosaic of PN junctions, together with means for reverse biasing the junctions. Information is stored in the junction by means of a partial depletion of the biasing condition of the junctions in accordance with and proportioned to varying quanta of incident radiation. The information is read out by restoring the bias condition, as by a scanning beam.

The method proposed for silicon tubes consists of measuring the temperature of the target wafer directly. The most suitable way to do this would be to use a test diode on the periphery of the wafer and provide suitable indication of its leakage current, which should follow or track the dark current, to adjust the black level in the camera automatically. If the area of such a test diode is $A_T$ and the total area of the diodes that are scanned by the electron beam is $A_S$, then the measured value of the leakage current from the test diode must be multiplied by a factor $A_S/A_T$ to equal the dark current in the entire video signal. Thus, this method also require careful adjustment of the black level correction circuits and this adjustment will depend somewhat on the size of the scanned area.

Another difficulty of this method is that electrical contact has to be made to the test diode which must be brought out through the tube enclosure.

It is therefore a primary object of this invention to provide a novel and unique arrangement for compensating for dark current variations.

It is another object to provide a novel and unique arrangement for compensating for dark current variations due to temperature in a silicon image tube without the need for manual adjustment or for bringing additional leads out of the silicon tube.

It is still a further object to provide a novel and unique arrangement for compensating for dark current variations in a video image tube while employing the existing circuitry found in conventional imaging systems with relatively few modifications.

In essence, the foregoing objects are attained by providing a vidicon tube with two photosensitive areas, a first of the areas having external radiation incident thereon and with means for preventing the external radiation from striking the second photosensitive area. An electrical signal is derived from each area and the difference between them obtained.

The dark current is representative of the leakage which takes place through the areas in the absence of the effect of external radiation. Variation in temperature or other environmental conditions will produce corresponding variations in leakage or dark current levels. The radiation shielded area will therefore provide a reference level which can be used as a compensating signal for the variation occuring in the first area.

In the silicon diode tube, dark current information is obtained by utilizing the assembly which forms the target area. The dark current can be obtained in different ways by suitable target organization. One method, for use in the silicon vidicon, is by providing a separate PN junction (or assembly of junctions) either on the target itself or on a separate substrate in close proximity to the target, and by substracting electronically the dark current from this junction (or assembly of junctions) from the target dark current. In this way a resultant dark current signal variation is obtained. Where a separate PN junction is used it is not necessary that the area of the separate junction be identical to that of the target itself, however, a relatively large junction area is more convenient in that the desired fraction of the dark current can then be subtracted from the target dark current to permit a more precise balancing. It may be found that the materials used result in the dark current in the compensating junction being generated via volume generation and that in the target via surface generation, with a different temperature dependence. To insure similar temperature dependency, the compensating junction can be arranged as a conveniently sized assembly of mosaiced junctions similar to those of the target, connected in parallel by means of a metallizing contact over the assembly and provided with an externally applied reverse bias. In the case of the compensating junction on the target itself, any junction (or line of junctions) outside the normally scanned raster region may be employed via overscanning to derive the subtraction signal. The only requirement is that no light from the scene is incident on the diodes which are used to measure the dark current. For this reason these diodes should not be immediately adjacent to those scanned for video information. This latter arrangement is preferred since only one lead need be provided and a single substrate employed. The dark current can be determined by the application of suitable electronics.

One manner in which this can be accomplished is during the vertical blanking interval of the frame time cycle. During the blanking interval the vertical retrace takes place and the beam is normally turned off.

Instead of starting the vertical retrace immediately after scanning the bottom horizontal frame line, a step function added to the vertical deflection causes the beam to scan a number of auxiliary lines below and removed from the actual target area to a reference area. The beam is turned on either for the whole length of these auxiliary lines or only during a portion of their length to avoid the edge of the wafer and its mounting. If no light is incident on this area of the wafer, the signal that passes through the video amplifier during this period is equal to the dark current. In order to avoid difficulties caused by raster instabilities, only a portion of the signal obtained while scanning the lines may be used as a measure of the dark current. This dark current level can then be gated into a sample-hold circuit. The dark current scan can be distinguished from the target area scan by means of suitable gating signals which activate or deactivate the sample-hold circuit. Because a section of a horizontal line is used and because the signal is assumed to be constant during this period, wide band width is not required and the measured dark current can be averaged, thus eliminating effects cause by possible nonuniformity or a defective diode or diodes in the auxiliary area of the wafer.

The output of the sample-hold circuit is a measure for the black level that must be subtracted from the video signal for compensation. Because this signal can be derived from the same video amplifier that is used for the video signal, no level adjustments are necessary.

The vertical retrace takes place after the reference area has been scanned. During this scanning signal blanking can be used to keep the dark current signal out of the video signal.

Figure 2:
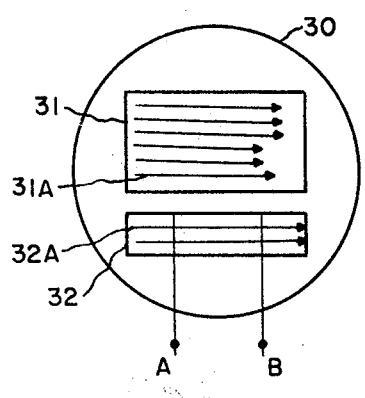

The foregoing objects and brief description will become more apparent from the following detailed explanation of illustrative embodiments of the invention, wherein FIGS. 1a, 1b and 1c schematically illustrate the assembly of targets for providing dark current generation. FIG. 2 illustrates the manner of overscanning to obtain the dark current signal, FIG. 3 is a schematic of a circuit for effecting compensation for an overscanned target and FIG. 4, an illustration of the graphical relationship of a detail of FIG. 3.

The important aspect of this invention is to derive a satisfactory dark current indication. This indication can be provided in several ways as discussed above. The preferred method, however, is by overscanning or by scanning nonlighted segments of the target. Each of the several alternative methods are discussed in further detail below and illustrated in FIGS. 1a, 1b and 1c.

Referring to FIG. 1a, the target area 10 of a silicon diode vidicon tube is illustrated. The target area includes a photosensitive substrate 11 which is composed of a suitable N-type semiconductor material. On the face of the substrate, a mosaic of areas 12 of a P-type material are provided. The P-type and N-type material thus form an array of diodes. The rear face 13 of the target 10 receives incident radiation 14 and the front face of the target containing the P-type mosaic receives the energy of a scanning deice such as an electron beam 15 generated by a suitable beam generating device illustrated as cathode 15a. The output A is taken from a lead 16.

The dark current signal is provided by means of an auxiliary or separate silicon PN junction 17 similar in composition to the target 10. The junction 17 has a contacting surface area which generates a dark current preferably equal to the dark current generated by the sum total of all of the contacting surface areas of the individual P-type material forming the mosaic on the target 10. Means are provided to block radiation 14 from falling onto the auxiliary junction 17. This could be either a physical shield affixed to the junction or form part of the tube which encloses the target. The separate junction 17 is provided with a pair of leads 18 for providing a reverse bias condition and for providing an indication of leakage current through the junction. The leads 16 and 18 are passed through the tube enclosure to the camera sensing electronics. Since leakage current is the dark current, and will vary in accordance with environment (i.e. temperature), the output of the auxiliary junction will provide a reference dark current level which can be used to compensate for variations in the dark current level of the target diode junctions.

The foregoing arrangement may however encounter complications in that the dark current in the large area compensating junction 17 may be a result of volume generation of minority carrier, whereas the dark current in the smaller area junctions of the target wafer 10 may arise as a result of surface generation. Since volume and surface generation may have differing responses to temperature variation, it is necessary to make some adjustment in order to provide an accurate relationship between the target wafer 10 and the compensating junction 17. One method of insuring uniform response is to alter the configuration of the compensating junction. As shown in FIG. 1b, this alteration provides that the compensating junction have a physical structure more like that of the target wafer 10 in order to insure a more uniform response characteristic. Specifically, the compensating junction is provided in FIG. 1b with a mosaiced surface 19 of P-type material forming a plurality of PN junctions upon a substrate 20 of N-type material. The plurality of PN junctions are then connected in parallel by means of a metallized contact 21, and the lead lines 22 bring out the terminals of the parallel connected diodes. The assembly of FIG. 1b acts as described above in connection with FIG. 1a, but with the additional advantage of uniformity in minority carrier generation response to environmental variations.

The foregoing embodiments, although effective in providing a compensated dark current signal, suffer from the practical disadvantage of bringing a multiplicity of leads through the tube envelope. To avoid this problem, while retaining the advantages of the above described embodiments, the arrangement shown in FIG. 1c is preferred. Specifically, an assembly 23 is provided with a major area 24 which serves as the target segment, and an auxiliary area 25 which serves as the compensating junction. Both of the segments are formed of a mosaic of P-type material arrayed across the surface of an N-type material substrate to form the assembly. The assembly 23 needs only one lead 26 to remove both the video signal from target area 24 and compensating dark current signal from auxiliary area 25. In this embodiment the video signal is removed from the target area by means of the scanning beam. The dark current signal results from the same scan cycle, the beam providing the reverse biasing of the junction diodes forming the surface of both the target and the auxiliary areas. The distinction between signals is made by external electronics, to be described below. The incident light 27 enters the assembly from the rear, and the image is stored in the diode mosaic on the assembly face 24. The image is converted into a signal along the output line 26 by virtue of an electron beam which scans the PN junctions forming the target segment 24 of the array. The PN junction forming the auxiliary segment 25 are also scanned by the beam. The auxiliary segment 25 is separated from the target segment 24 by virtue of a spaced area 28 and is shielded from external light 27 by a suitable shield 29 mounted directly on the back of the assembly 23.

The tube screen, in terms of scanned area, is illustrated in FIG. 2. The target screen 30 of a silicon vidicon tube will have a major area 31 which responds to the presence of incident light to store an image for a frame time duration. Below the area 31 is an auxiliary area 32 which is shielded from the incident light 31 on the major area 31 and will have the same environmental response characteristic as the major area 31.

The overscanning method is preferred because there is no need to bring out extra leads. However, the overscanned area should be sufficiently isolated from the target area so as to prevent erroneous readings due to optical scattering effects and the like in the target substrate. These effects may cause an erroneous reading in dark current by contaminating the dark current area junctions.

The area 30, as shown in FIG. 2 is the target face of the camera tube 33 of FIG. 3. The tube includes horizontal and vertical deflection coils 34 and a beam generating cathode 35. It is understood that a nonbeam device which employs a silicon diode target and coincident electronic scanning, such as is disclosed in copending application Ser. No. 750,086, filed Sept. 6, 1968, could also be employed and the use of electron beam scanning is illustrated herein solely for purposes of exemplification.

The signal output of the tube 33 representing the incident light appears along line 36 and is directed through a stage of video amplification 37. A vertical scan generator 38 serves to generate the vertical scanning signal necessary for directing the beam along the diode array for reading the image stored on the screen 30 of the tube 33. As shown in FIG. 2, the signal representing dark current generation is produced by reading a sub screen or auxiliary area 32. To allow scanning of this segment, the vertical scan circuit is periodically activated by means of level stepping circuit 39 which is coupled to the scan circuit. The step occurs at the end of the last horizontal trace 31A on the screen 30 and serves to continue a progressive horizontal trace 32A on the lower auxiliary area 32 of the screen target 30. Control of the vertical scan circuit 38 and stepping circuit 39 is derived from a sync generator 40. When the last line of the major area has been scanned, the step function is provided from the sync circuit.

The end of the major area trace (area 31) customarily turns off the electron beam to allow the vertical retrace prior to the beginning of the next frame time. To allow the auxiliary trace of area 32, a coincident gating circuit 41, responding to the level stepping signal along line 42, responds in turn to allow the beam generation control circuit 43 to continue beam operation.

The dark current signal thereby generated is passed along line 36 through the video amplifier 37 into a coincident gating circuit 44 which allows the dark current signal output from the video amplifier 37 to pass through to a storage circuit such as the sample-and-hold circuit 45. The sample-and-hold circuit retains the magnitude of the dark current signal during the next successive frame time of the major area 31. During this time, signal blanking is effected to keep the dark current out of the video signal. The signal blanking occurs because the gating circuit 44 is blocked by the absence of the step level signal or an effectively "zero" signal, and the video signal is passed directly to a subtraction unit 46. This unit, which may employ a conventional differential input operational amplifier, combines the video signal with the dark current signal stored in the sample-and-hold circuit 45. Since the polarization of the inputs of the amplifier 46 is such as to effect subtraction of the dark current from the video signal, the output appearing at 48 is an automatically compensated video signal. The RC unit 47 connected between the storing circuit and the amplifier 46 is employed for averaging the series of dark current signals, thereby eliminating discontinuities or effects caused by possible nonuniformities in the scanning area, or possibly a bad diode in the target mosaic in the case of a silicon mosaic target.

Figure 4:
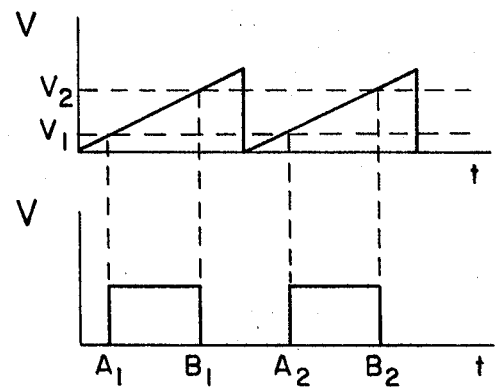

In order to avoid difficulties which might arise due to raster instability or distortion at the frame edges, a thresholding circuit 49 can be employed which will insure that only the area between points A and B on the lower area 32 (FIG. 2) will be scanned. The threshold circuit 49 operates to place a gating pulse into the gating circuit 44 delimiting the dark current readout from the video amplifier. In operation, the threshold circuit 49 can operate $V_1$ and a second $V_2$ for turning a pulse on and off respectively. This relationship is illustrated in FIG. 4, illustrating voltage (V) as a function of time (T) and the manner in which a ramp scan signal is delimited between levels $V_2$ and $V_1$ to generate specific duration pulses.

While the invention has been described and shown with reference to certain preferred embodiments thereof, it will be understood by those skilled in the art that other changes in form and details may be made therein without departing from the spirit and scope of the invention.

We claim:

1. An automatic dark current correction device comprising a camera tube having two photosensitive areas on a single substrate, scan means for repetitively and sequentially scanning both of said photosensitive areas, the first of said sensitive areas responsive to external light incident thereon, means for preventing said external light from being incident on said second area, said first and second areas each comprising an array of PN junctions, means connected to said scan means for generating a first and second electrical signal in accordance with the duration of said first area scan and said second area scan respectively, first circuit means coupled to said tube and responsive to said first signal for providing a third electrical signal indicative of said external light, second circuit means coupled to said tube and responsive to said second signal for providing a fourth electrical signal indicative of dark current, means for storing said fourth signal for a duration of time necessary to obtain the next successive one of said third signals, and means for subtracting said fourth signal from said third signal thereby obtaining a dark current corrected signal.

2. The combination of claim 1 further including means connected between said camera and said means for storing and responsive to said second signal for delimiting said fourth signal to provide upper and lower limits to the scanning of said second area.

3. The combination of claim 1 further including a vertical scan circuit connected to said tube for providing said tube with sequential scanning of said first area and means for placing a step function into said vertical scan circuit at the end of said first area scan for shifting the beam to said second area.

4. The combination of claim 1 wherein said means for storing includes an RC circuit for averaging the series of dark current signal indications to smooth out discontinuities.

5. An automatic dark current correction device comprising a camera tube having two photosensitive areas formed in an assembly on a common substrate of a N-type material, a mosaic of P-type material arranged across the surface of said N-type material to form a plurality of PN junctions, a first portion of said PN junctions forming a first of said two areas, and a second portion of said PN junctions forming a second of said two areas, said first area having radiation incident thereon and said second area including means for shielding said second portion of PN junctions from said incident radiation, each of said first area PN junctions possessing a stored signal indicative of incident radiation and each of said second area PN junctions possessing a stored signal indicative of a dark current level, said camera tube including means for repetitively scanning said array of PN junctions for providing an output signal from each of said arrays indicative of the signal stored therein, a storage circuit coupled to said tube and responsive to the output of each successive scan for storing a corresponding signal representative of said dark current level, and means coupled to said tube and said storage circuit for repetitive subtracting each respective dark current signal from each respective incident radiation signal so as to provide an output signal corrected for dark current variation.

PO-1050
(5/69)

UNITED STATES PATENT OFFICE
CERTIFICATE OF CORRECTION

Patent No. 3,584,146         Dated June 8, 1971

Inventor(s) Pieter G. Cath; Edward H. Stupp and Edmund S. Rittner

It is certified that error appears in the above-identified patent and that said Letters Patent are hereby corrected as shown below:

Col. 1, line 41,   "require" should be --requires--;

Col. 4, line 17,   "junction" should be --junctions--;

Col. 4, line 27,   "31" (1st occurence) should be --falling--;

Col. 5, line 27,   after "operate" insert -- the horizontal scan signal to between a first threshold--.

Signed and sealed this   1st   day of August   1972.

(SEAL)
Attest:

EDWARD M. FLETCHER, JR.              ROBERT GOTTSCHALK
Attesting Officer                    Commissioner of Patents